United States Patent Office 3,514,360
Patented May 26, 1970

3,514,360
METHOD OF BONDING POLYMERIC MATERIALS HAVING PEPTIDE (—CONH—) LINKAGES
Thomas Joseph Crowley, North Mall, Ireland, assignor to The Dunlop Company Limited, a British company
No Drawing. Filed Feb. 1, 1967, Ser. No. 613,101
Claims priority, application Great Britain, Feb. 10, 1966, 5,866/66
Int. Cl. C09i 5/02
U.S. Cl. 156—308          21 Claims

ABSTRACT OF THE DISCLOSURE

A method of bonding together polymeric materials having peptide (—CONH—) linkages which comprises treating the surfaces to be bonded with a halide, oxyhalide or organohalide of phosphorus, arsenic or antimony.

---

This invention relates to a method of bonding polymeric materials having peptide (—CONH—) linkages.

According to the present invention, a method of bonding a surface of a polymeric material having peptide (—CONH—) linkages to another surface of a polymeric material having peptide (—CONH—) linkages comprises treating at least one of the surfaces to be bonded with a halide, oxyhalide or organohalide of an element of Group V–B of the Mendeleeff Periodic Table as hereinafter defined, and contacting the surfaces to be bonded.

Also, the present invention includes the product of the method described in the immediately-preceding paragraph.

By "an element of Group V–B of the Mendeleeff Periodic Table," as used in this specification, there is meant, phosphorus, arsenic or antimony. As stated above, the method of bonding comprises treating at least one of the surfaces to be bonded with a halide, oxyhalide, or organohalide, of phosphorus, arsenic or antimony. Preferably the halide radical is a chloride radical although it may alternatively be a fluoride, bromide or iodide radical, provided the compound can be obtained in a form that is suitable for treating a surface to be bonded, for example, in liquid, vapour, solution or dispersion form. Preferably also, the oxyhalide or organohalide has at least two halide radicals attached to the Group V–B element and a suitable organohalide may comprise a phenyl group and at least two halide radicals attached to the Group V–B element. Examples of suitable halides, oxyhalides and organohalides of Group V–B elements are signified by the following chemical formulae:

$PCl_3$, $PBr_3$, $PI_3$, $PCl_5$, $PBr_5$, $P(O)Cl_3$, $P(O)FCl_2$, $P(O)Br_3$, $P(O)Br_2F$, $C_6H_5PCl_2$, $C_2H_5P(O)Cl_2$, $AsF_3$, $AsCl_3$, $AsBr_3$, $CH_3AsCl_2$, $(C_6H_5)_3AsCl_2$, $SbF_3$, $SbCl_3$, $SbBr_3$, $SbF_5$, $SbCl_5$, $(CH_3)_2SbCl_2$, $(CH_3)_3SbBr_2$, $(C_6H_5)_3SbCl_2$ and $(C_6H_5)_3SbBr_2$.

If desired, a mixture of two or more halides, oxyhalides, and/or organohalides of one or more Group V–B elements may be used to treat a surface to be bonded.

Preferably, the halide, oxyhalide or organohalide is employed as a solution or dispersion and usually the halide, oxyhalide or organohalide is employed as a solution in an inert organic solvent such as benzene, cyclohexane, carbon tetrachloride or an ether. Such a solution may comprise at least 1 percent, preferably from 5 to 15 percent, by volume, of the halide, oxyhalide or organohalide.

The method of this invention can be used to bond any polymeric material having peptide (—CONH—) linkages, for example, a polyurethane or a polyamide such as Nylon 6, Nylon 66 or Nylon 610, and the surfaces to be bonded together may be of the same or different polymeric material. The materials may be in any form, such as fibres, monofilaments, powders, granules, felts, fabrics (including woven and nonwoven fabrics such as "weftless" cord fabrics), plain sheets (including fabric-reinforced sheets), films and shaped articles. The method of this invention may be used to bond together at least part of the fibres of a felt or the threads of a fabric and/or it may be used to bond a surface of a piece of felt or fabric to a surface of a similar or different material having peptide linkages. It is found that particularly good bonds can be obtained if a surface to be bonded is buffed prior to treatment with the halide, oxyhalide or organohalide.

If desired, the polymeric material having peptide linkages may be in admixture with a further material which does not have peptide linkages. Preferably the further material is stable to the halide, oxyhalide or organohalide employed in the method of this invention and a suitable further material is a polymeric material such as polypropylene. The further material may be present in an amount of, for example, up to 50 percent by weight based on the total weight of the polymeric material having peptide linkages and the further material. Such a further polymeric material may be used to advantage in the manufacture of a bonded felt by the method of this invention. It is found that the bonded felts made by the method of this invention wherein polypropylene fibres are employed as the further material, increase in softness as the proportion of polypropylene fibres in the felt increases.

As stated above, at least one of the surfaces to be bonded may be treated with the halide, oxyhalide or organohalide in any suitable form, e.g. as a liquid, vapour, solution or dispersion, and the treatment may comprise dipping, spraying, brushing or immersion in a vapour. In general, the time of treating the surface or surfaces to be bonded with the halide, oxyhalide or organohalide should be only a few seconds so that only the surface of the materials is treated and the interior portion of the material remains unaltered. After treatment and prior to bringing the surfaces to be bonded into contact with each other, each treated surface is normally exposed to air which may be at an ambient temperature or at an elevated temperature, or both consecutively. This exposure to air is especially desirable when the halide, oxyhalide or organohalide is in the form of a solution or dispersion. When the method of this invention is used to bond together the fibres or filaments of a felt, the treated felt may be washed with water or a suitable solvent such as acetone in addition to or as an alternative to the exposure to air. Such washing generally lowers the degree of bonding in the felt and therefore may be done when a modified felt having a comparatively low breakage strength in a direction perpendicular to the overall filament direction is desired. The time of exposure to air and/or washing should be such that the treated surface has just sufficient tackiness to produce a useful bond when subsequently brought into contact with the surface to which it is to be bonded. Usually, it is found that the procedure of exposure to air and/or washing should be varied according to the form of the material to be bonded, e.g. whether it is in the form of a plain sheet or film or in the form of a felt, and according to the halide, oxyhalide or organohalide employed.

To illustrate the different procedures of exposure to air and/or washing that may be applied to the treated surfaces of different forms of polymeric materials in order to obtain optimum bond-strengths, the preparation and bonding of a plain sheet and of a felt, respectively, may be considered, by way of example only, as follows:

The surfaces of a plain nylon sheet which may be buffed or unbuffed are dipped for a few seconds in a solution of phosphorus trichloride and, after excess solution has been shaken off, the sheet is preferably allowed to stand in air at room temperature for between 10 seconds and 5 minutes before being bonded to a similarly treated sheet in a press at a temperature of from 100° C. to 110° C. for 2 minutes. Usually, the temperature of the press is at least 10° C. higher than the boiling point of the solvent used to dissolve the phosphorus trichloride. If phosphorus oxytrichloride is used in place of the phosphorus trichloride in the above procedure, no detrimental effect will be caused by allowing the sheet to stand in air at room temperature for up to 2 hours after treatment with the phosphorus oxytrichloride solution, as compared to the preferred maximum of 5 minutes when phosphorus trichloride solution is used. Moreover, if desired, surfaces treated with phosphorus oxytrichloride may be pressed together soon after treatment and later bonded by heating at, for example, 120° C. under pressure.

The method of this invention when applied to a felt would suitably be as follows.

The nylon felt which may be of staple or continuous fibres or filaments is dipped into a phosphorus trichloride solution for a few seconds, excess solution is shaken off, and the treated felt may then be washed with acetone and/or water before being dried in an oven at between 100° C. and 110° C. for 4 to 10 minutes. However, in most cases the treated felt is preferably dried in an oven at between 100° C. and 110° C. for 4 to 10 minutes without the preliminary washing. The product is a stabilised felt having modified properties. A compressed felt resembling parchment can be obtained by heating the treated felt under pressure until it is dry.

The method of this invention can be used in the construction of any article in which strong bonds between polymeric materials having peptide (—CONH—) linkages are desired, for example, in containers or linings for containers or any large scale fabrications. Nylon felts bonded by the method of this invention under pressure to form a parchment-like product may be used as filter fabrics or in the manufacture of synthetic leather.

The invention is illustrated in the following examples:

EXAMPLE I

Unbuffed nylon films of various thicknesses were dipped in a 10 percent by volume solution of phosphorus trichloride in cyclohexane for a few seconds and, after shaking off excess solution, each treated film was exposed to air at room temperature (ca. 20° C.) for 30 seconds before being bonded to a similarly treated nylon film of the same thickness in a press at 100° C. for 2 minutes. When the shear-strengths of the bonds were tested, the nylon films ruptured and the bonds remained intact. The results are given in Table I, in which the breakage strengths are those of the films.

TABLE I

| Nylon | Film thickness (in.) | Breakage strength (p.s.i.) |
|---|---|---|
| Nylon 6 | 0.020 | 440 |
| Nylon 66 | 0.040 | 500 |
| Nylon 66 | 0.080 | 700 |

A shear-strength of about 16,000 lb./sq. in. was obtained when a 1/16 in. overlap bond between two 0.020 in. thick nylon 6 films was tested.

EXAMPLE II

Samples of a crimped continuous 6 denier nylon 66 filament felt were dipped into a 15 percent by volume solution of phosphorus trichloride in cyclohexane, excess solution was shaken off, and then the treated samples were subjected to one of the following processes, A, B, C or D, before their bond-strengths were tested:

A=None.
B=Washed with water for about 10 seconds and then dried in an oven at 110° C. for 10 minutes.
C=Washed with acetone for about 10 seconds and then dried in an oven at 110° C. for 10 minutes.
D=Dried in an oven at 110° C. for about 10 minutes.

The results of the bond-strength tests on the above treated samples are given in Table II, in which:

50% F=Force ($g$) required to extend the felt by 50 percent of its original length in a direction perpendicular to the overall filament direction.

Perp. F=Force ($g$) required to break the felt assembly in a direction perpendicular to the overall filament direction.

Para. F=Force ($g$) required to break the felt assembly in a direction parallel to the overall filament direction.

TABLE II

|  | A | B | C | D |
|---|---|---|---|---|
| 50% F | 2 | 40 | 75 | 300 |
| Perp. F | 4 | 190 | 125 | 620 |
| Para. F | 3,000 | 2,200 | 1,400 | 750 |

The tests perpendicular to the overall filament direction were performed on 1 in. wide samples and the tests parallel to the overall filament direction were performed on 0.2 in. wide samples.

EXAMPLE III

Two 0.02 in. thick films of unbuffed nylon 6 were dipped in a 15 percent by volume solution of phosphorus oxytrichloride in carbon tetrachloride for 15 seconds, excess solution was shaken off, and the treated films were allowed to stand in air at room temperature (ca. 20° C.) for 3 minutes before being bonded together in a press at about 120° C. The peel strength (lb./in.) and shear tensile strength (lb./sq. in.) of the bond were then measured. The experiment was then repeated with nylon 6 films which were buffed before being dipped into the phosphorus oxytrichloride solution and the results are given in Table III.

TABLE III

|  | Peel strength | Tensile strength |
|---|---|---|
| Unbuffed nylon | 7 | 280 |
| Buffed nylon | 8.5 | 410 |

With regard to the shear tensile strength measurements in Table III, the value given for the unbuffed nylon is that at which the bond ruptured and the value given for the buffed nylon is that at which the film ruptured whilst the bond remained intact.

EXAMPLE IV 0.02 in. thick buffed nylon 6 films were each dipped for a few seconds into one of the 10 to 15 percent by volume solutions of a halide, oxyhalide or organohalide of an element of Group V-B of the Mendeleeff Periodic Table in an organic solvent, as given below, and, after shaking off excess solution, each treated film was allowed to stand in air at room temperature (ca. 20° C.) for about 30 seconds before being bonded to a similarly treated film in a press at about 120° C. using a 15 ton weight on a 4 in. diameter ram. The tensile strengths (lb./sq. in.) of the resulting bonds were then measured on an "Instron" tester at a strain rate of 2 in./min. The results are given in Table IV in which B denotes bond rupture, and F denotes film rupture.

TABLE IV

| Compound | Solvent | Tensile strength | B or F |
|---|---|---|---|
| $PCl_5$ | $CCl_4$ | 435 | B |
| $C_6H_5P(O)Cl_2$ | $CCl_4$ | 285 | F |
| $C_6H_5PCl_2$ | $CCl_4$ | 300 | F |
| $AsCl_3$ | Ether | 190 | F |
| $SbCl_3$ | $CHCl_3$ | 485 | F |
| $SbCl_5$ | $CHCl_3$ | 200 | F |
| $BiCl_3$ | $C_2H_5OH$ | 0 | B |
| $Bi(O)Cl$ | Ether | 0 | B |

The Bi(O)Cl was employed as a dispersion in ether.

The above results show the suitability of phosphorus, arsenic and antimony compounds and the unsuitability of bismuth compounds when employed in the method of this invention.

EXAMPLE V

Two 0.015 in. thick unbuffed films of a polyurethane, W, prepared as hereinafter described, were dipped in a 15 percent by volume solution of phosphorus trichloride in carbon tetrachloride, excess solution was shaken off, and, after allowing to stand in air at room temperature (ca. 20° C.) for 30 seconds, the films were bonded together in a press at 115° C. for 2 minutes. The peel strength (lb./in.) and tensile strength (lb./sq. in.) of each bond were then measured. This procedure was then repeated for other films of polyurethane or nylon 6 and for either the phosphorus trichloride solution or a 15 percent by volume solution of phosphorus oxytrichloride in carbon tetrachloride. The results are given in Table V in which the following abbreviations have been made for the sake of convenience:

W=A polyurethane prepared by reacting a polytetrahydrofuran of M.W. 900 with excess tolylene diisocyanate and curing the resulting prepolymer with 80 percent of the stoichiometrical amount of methylene-bis-orthochloraniline.

X=A polyurethane prepared by reacting a polyethylene adipate of M.W. 2000 with excess diphenylmethane diisocyanate and curing the resulting prepolymer with 80 percent of the stoichiometrical amount of methylene-bis-orthochloraniline.

Y=A polyurethane prepared by reacting a polytetrahydrofuran of M.W. 1355 with excess tolylene diisocyanate and curing the resulting prepolymer with 80 percent of the stoichiometrical amount of methylene-bis-orthochloraniline.

Z=A polyurethane prepared by mixing HAF black with a millable polyurethane rubber obtainable under the trade name "Urepan 601" and reacting the mixture with dimeric tolylene diisocyanate in the presence of polycarbodiimide.

(b)=Buffed.
(fr)=Nylon fabric-reinforced.
B=Bond rupture.
F=Film rupture.

TABLE V

| Films bonded | Film thickness (in.) | Peel strength (lb./in.) | Tensile strength (lb./sq. in.) |
|---|---|---|---|
| (i) Phosphorus Trichloride Solution | | | |
| 2 X, W | 0.015 | 0.5 | 100 (B) |
| 2 X, X | 0.004 | 2 | 15 (F) |
| 2 X, W(b) | 0.015 | 5 | 200 (F) |
| 2 X, Y | 0.026 | 21 | 360 (F) |
| 2 X, Z(b) | 0.025 | | 200 (F) |
| Nylon 6+W(b) | 0.020 | 6 | 110 (B) |
| 2 X, Z(fr) | 0.075 | | 116 (B) |
| (ii) Phosphorus Oxytrichloride Solution | | | |
| 2 X, Z(b) | 0.025 | 2 | 50 (F) |
| 2 X, Y | 0.025 | 7.5 | 315 (F) |
| 2 X, W(b) | 0.015 | 2.5 | 270 (B) |

EXAMPLE VI

Two sheets of a continuous crimped nylon filament felt were dipped into a 10 percent by volume solution of phosphorus trichloride in carbon tetrachloride and, after allowing excess solution to drain off, the sheets were assembled in overlapping relationship with their overall filament directions at right-angles and the assembly was heated at 150° C. for 2 minutes under a pressure of 20 tons on a 4 in. diameter ram. After being washed and dried, the resulting compressed felt was hard, resembled parchment and had a tensile strength of 7,506.3 lb./sq. in. Unlike plain nylon sheet, it could be written on with a pencil, a ball-point pen and a fountain pen.

EXAMPLE VII

A sheet of carded Nylon 66 staple fibres having a density of 30 g./sq. ft. was lightly needled to impart a degree of stability and was then dipped into a 10 percent by volume solution of phosphorus trichloride in carbon tetrachloride. Excess solution was allowed to drain off and the sheet was then placed in a spacer mould and pressed using a mould spacing of 2 mm. for 3 minutes at 110° C. A spacer mould, it is to be understood, is a mould, the space-volume or spacing of which may be varied by employing spacing elements or spacers of various dimensions. The pressed sheet was washed with dilute aqueous ammonia and then dried and its tensile strength was measured. This experiment was repeated for various mould spacings and the results are given in Table VI:

TABLE VI

| Mould spacing (mm.) | 2 | 2.5 | 3 | 3.5 |
|---|---|---|---|---|
| Tensile strength (lb./sq. in.) | 321.4 | 56.9 | 24.2 | 61.2 |

All of the products were porous and had smooth surfaces.

EXAMPLE VIII

A sheet of carded staple fibres consisting of a mixture of Nylon 66 and polypropylene fibres in the weight proportions 87.5:12.5, having a density of 30 g./sq. ft., was lightly needled to impart handling stability and was then dipped into a 10 percent by volume solution of phosphorus trichloride in carbon tetrachloride for 1 minute. Excess solution was allowed to drain off and the sheet was then pressed in a spacer mould for 2 minutes at 110° C. The pressed sheet was washed with dilute aqueous ammonia and dried. The experiment was repeated using sheets of Nylon 66 and polypropylene staple fibres in the weight proportions 75:25 and 50:50, respectively, and using various mould spacings.

It was found that the softness of the product increased as the proportion of polypropylene fibres in the sheet was increased.

Having now described my invention, what I claim is:

1. A method of bonding a surface of a polymeric material having peptide (—CONH—) linkages to another surface of a polymeric material having peptide (—CONH—) linkages comprising treating at least one of the surfaces to be bonded with a halide, oxyhalide or organohalide of an element selected from the Group V–B elements, phosphorus, arsenic and antimony, contacting the surfaces to be bonded and isolating a bonded product.

2. A method according to claim 1 in which at least one of the surfaces to be bonded is that of a plain sheet.

3. A method according to claim 1 in which at least one of the surfaces to be bonded is buffed prior to being treated with said halide, oxyhalide or organohalide.

4. A method according to claim 1 in which at least one of the surfaces to be bonded is that of a fibre in a felt.

5. A method according to claim 4 in which the felt is heated under pressure until dry after being treated with said halide, oxyhalide or organohalide.

6. A method according to claim 1 in which at least one of the surfaces to be bonded is treated with a solution of said halide, oxyhalide or organohalide in an inert organic solvent.

7. A method according to claim 6 in which the solution comprises at least 1 percent by volume of said halide, oxyhalide or organohalide.

8. A method according to claim 7 in which the solution comprises from 5 to 15 percent by volume of said halide, oxyhalide or organohalide.

9. A method according to claim 1 in which after being treated with said halide, oxyhalide or organohalide and prior to contacting the surfaces to be bonded, at least one of the surfaces to be bonded is exposed to air.

10. A method according to claim 1 in which at least one of the surfaces to be bonded is that of a fibre in a felt and said surface is washed with water after being treated with said halide, oxyhalide or organohalide and prior to contacting the surfaces to be bonded.

11. A method according to claim 1 in which at least one of the polymeric materials having peptide linkages is in admixture with a further material not having peptide linkages.

12. A method according to claim 11 in which the further material is present in an amount of up to 50 percent by weight based on the total weight of the polymeric material having peptide linkages and the further material.

13. A method according to claim 11 in which the further material is a polymeric material which is stable to the treatment of said halide, oxyhalide or organohalide.

14. A method according to claim 13 in which the further polymeric material is polypropylene.

15. A method according to claim 1 in which the halide, oxyhalide or organohalide comprises a chloride radical.

16. A method according to claim 1 in which the oxyhalide or organohalide comprises at least two halide radicals attached to the Group V–B element.

17. A method according to claim 1 in which at least one of the surfaces to be bonded is that of a polyurethane.

18. A method according to claim 1 in which at least one of the surfaces to be bonded is that of a polyamide.

19. A method according to claim 1 in which a plain sheet of a polymeric material having peptide linkages is dipped into a solution of phosphorus trichloride in an inert organic solvent and the treated sheet is allowed to stand in air at room temperature for between 10 seconds and 5 minutes before being bonded at a temperature of at least 10° C. higher than the boiling point of the solvent to a similarly treated surface of a polymeric material.

20. A method according to claim 1 in which a plain sheet of a polymeric material having peptide linkages is dipped into a solution of phosphorus oxytrichloride in an inert organic solvent and the treated sheet is allowed to stand in air at room temperature for up to 2 hours before being bonded at a temperature of at least 10° C. higher than the boiling point of the solvent to a similarly treated surface of a polymeric material having peptide linkages.

21. A method according to claim 1 in which a felt of a polymeric material having peptide linkages is dipped into a solution of phosphorus trichloride in an inert organic solvent and the treated sheet is dried in an oven at from 100° C. to 110° C. for 4 to 10 minutes.

References Cited

UNITED STATES PATENTS

| 2,772,995 | 12/1956 | Wilson | 161—227 X |
| 3,247,015 | 4/1966 | Zimmerman et al. | 252—8.1 X |
| 3,432,559 | 3/1969 | Maier | 252—8.1 X |

FOREIGN PATENTS

| 116,140 | 11/1942 | Australia. |
| 269,920 | 2/1963 | Australia. |
| 802,077 | 10/1958 | Great Britain. |

REUBEN EPSTEIN, Primary Examiner

U.S. Cl. X.R.

156—325; 161—190, 227